United States Patent [19]

Shipley et al.

[11] 4,308,369

[45] Dec. 29, 1981

[54] HIGH EFFICIENCY CATALYST FOR POLYMERIZING OLEFINS

[75] Inventors: Randall S. Shipley, Alvin; Donald F. Birkelbach, Angleton; Kirby Lowery, Jr., Lake Jackson, all of Tex.

[73] Assignee: The Dow Chemical Company, Midland, Mich.

[21] Appl. No.: 155,359

[22] Filed: Jun. 2, 1980

Related U.S. Application Data

[63] Continuation-in-part of Ser. No. 79,663, Sep. 28, 1979, abandoned, which is a continuation-in-part of Ser. No. 939,637, Sep. 5, 1978, abandoned.

[51] Int. Cl.$^3$ .......................... C08F 4/64; C08F 10/00
[52] U.S. Cl. ...................................... 526/122; 526/125; 526/128; 526/132; 526/133; 526/137; 526/144; 526/150; 526/151; 526/352
[58] Field of Search ............... 526/122, 125, 128, 132, 526/133, 137, 144, 151, 139, 150

[56] References Cited

U.S. PATENT DOCUMENTS

| | | | |
|---|---|---|---|
| 3,245,973 | 4/1966 | Natta et al. | 526/151 |
| 3,252,958 | 5/1966 | Giachetti et al. | 526/151 |
| 3,676,415 | 7/1972 | Diedrich et al. | 526/122 |
| 4,115,319 | 9/1978 | Scata et al. | 526/125 |
| 4,120,820 | 10/1978 | Birkelbach | 526/125 |

FOREIGN PATENT DOCUMENTS

| | | | |
|---|---|---|---|
| 2135884 | 1/1972 | Fed. Rep. of Germany | 526/124 |
| 902845 | 8/1962 | United Kingdom | 526/151 |
| 1286867 | 8/1972 | United Kingdom | 526/125 |
| 1310547 | 2/1973 | United Kingdom | 526/125 |
| 1352901 | 5/1974 | United Kingdom | 526/125 |
| 1492379 | 11/1977 | United Kingdom . | |
| 1500873 | 2/1978 | United Kingdom . | |

*Primary Examiner*—Edward J. Smith
*Attorney, Agent, or Firm*—J. G. Carter

[57] ABSTRACT

Olefins are polymerized in the presence of a catalyst prepared by reacting tetravalent titanium compounds such as a titanium tetraalkoxide, an anhydrous zinc compound such as diethyl zinc, an organomagnesium component such as a hydrocarbon soluble complex of dialkyl magnesium and an alkyl aluminum and a halide source such as a hydrogen halide or an alkyl aluminum halide and an aluminum compound if the halide source or organomagnesium component does not contain sufficient quantities of aluminum. Polymerization processes employing this catalyst composition do not require conventional catalyst removal steps in order to provide polymers having suitable color and other physical characteristics and these catalysts produce polymers having broader molecular weight distributions than do corresponding catalysts without the anhydrous zinc compound.

24 Claims, No Drawings

HIGH EFFICIENCY CATALYST FOR POLYMERIZING OLEFINS

CROSS REFERENCE TO RELATED APPLICATION

This application is a continuation-in-part of copending application Ser. No. 079,663 filed Sept. 28, 1979, now abandoned which is a continuation-in-part of copending application Ser. No. 939,637 filed Sept. 5, 1978, now abandoned.

BACKGROUND OF THE INVENTION

This invention relates to a new catalyst composition useful for initiating and promoting polymerization of α-olefins and to a polymerization process employing such a catalyst composition.

It is well known that olefins such as ethylene, propylene and 1-butene in the presence of metallic catalysts, particularly the reaction products of organometallic compounds and transition metal compounds, can be polymerized to form substantially non-branched polymers of relatively high molecular weight. Typically such polymerizations are carried out at relatively low temperatures and pressures.

Among the methods of producing such linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups IVB, VB, VIB and VIII of Mendeleev's Periodic Table of Elements with an organometallic compound. Generally, the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, polymerization is carried out in a reaction medium comprising an inert organic liquid, e.g. an aliphatic hydrocarbon, and the aforementioned catalyst. One or more olefins may be brought into contact with the reaction medium in any suitable manner. A molecular weight regulator, which is normally hydrogen, is usually present in the reaction vessel in order to suppress the formation of undesirably high molecular weight polymers.

Following polymerization, it is common to remove catalyst residues from the polymer by repeatedly treating the polymer with alcohol or other deactivating agent such as aqueous base. Such catalyst deactivation and/or removal procedures are expensive both in time and material consumed as well as the equipment required to carry out such treatment.

Furthermore, most of the aforementioned known catalyst systems are more efficient in preparing polyolefins in slurry (i.e., wherein the polymer is not dissolved in the carrier) than in solution (i.e., wherein the temperature is high enough to solubilize the polymer in the carrier). The lower efficiencies of such catalysts in solution polymerization are believed to be caused by the general tendency of such catalysts to become rapidly depleted or deactivated by the significantly higher temperatures that are normally employed in solution processes. In addition, processes involving the copolymerization of ethylene with higher α-olefins exhibit catalyst efficiencies significantly lower than ethylene homopolymerization processes.

Catalysts having higher efficiencies have been disclosed, e.g., U.S. Pat. No. 3,392,159, U.S. Pat. No. 3,737,393, West German Patent Application No. 2,231,982 and British Pat. Nos. 1,305,610 and 1,358,437. While the increased efficiencies achieved by using these recent catalysts are significant, even higher efficiencies are desirable, particularly in copolymerization processes. Recently, catalysts having even higher efficiency have been disclosed for use in homopolymerization or copolymerization processes, e.g., U.S. Pat. No. 4,097,659 and British Pat. Nos. 1,492,379 and 1,500,873. These high efficiency catalysts generally produce polymers of relatively narrow molecular weight distribution and poor high shear melt flow properties. It is therefore desirable to have, for some applications such as for use in film applications and injection molding, high efficiency catalysts which produce polymers and copolymers having a broader molecular weight distribution as demonstrated by improved high shear melt flow characteristics ($I_{10}/I_2$).

In view of the foregoing problems encountered in the use of conventional Ziegler catalysts, it would be highly desirable to provide a polymerization catalyst that is sufficiently active, even at solution polymerization temperature above 140° C., to produce such high quantities of olefin homopolymers or copolymers per unit of catalyst that it is no longer necessary to remove catalyst residues in order to obtain a polymer of the desired purity while at the same time showing excellent high shear melt flow characteristics in order to provide ease of processing for film and injection molding applications.

SUMMARY OF THE INVENTION

The present invention, in one aspect, is the catalytic reaction product of (A) a tetravalent titanium compound, (B) an anhydrous divalent hydrocarbyl zinc compound, (C) an organomagnesium component and (D) a halide source. If components (C) and/or (D) do not contain sufficient quantities of an aluminum compound, then additional quantities of an organoaluminum compound should be added. The magnesium component is (1) a complex of an organomagnesium compound and an organometallic compound which solubilizes the organomagnesium compound in a hydrocarbon solvent or (2) an organomagnesium compound. The halide source is a non-metallic halide corresponding to the formula R'X wherein R' is hydrogen or an active monovalent organic radical and X is halogen. Alternatively, the halide source is a metallic halide corresponding to the formula $MR_{y-a}X_a$ wherein M is a member selected from Group IIIA or IVA of Mendeleev's Periodic Table of the Elements, R is a monovalent organic radical, usually hydrocarbyl or hydrocarbyloxy, X is halogen, y is a number corresponding to the valence of M and a is a number from 1 to y. The proportions of the foregoing components of said catalytic reaction products are such that the atomic ratios of the elements are:

Zn:Mg is from about 0.02:1 to about 25:1; preferably from about 0.1:1 to about 20:1, most preferably from about 0.2:1 to about 10:1;

Zn:Al is from about 0.02:1 to about 50:1; preferably from about 0.05:1 to about 20:1: most preferably from about 0.1:1 to about 10:1;

Zn:Ti is from about 0.1:1 to about 200:1; preferably from about 0.5:1 to about 100:1; most preferably from about 1:1 to about 75:1;

excess X:Al is from about 0.0005:1 to about 10:1; preferably from about 0.002:1 to about 2:1; most preferably from about 0.01:1 to about 1.4:1.

The excess X is the quantity of halide above that which would be theoretically required to convert the magnesium compound to the dihalide.

In a second aspect, the invention is a process for polymerizing at least one α-olefin under conditions characteristic of Ziegler polymerization wherein the aforementioned reaction product is employed as the sole catalyst when such contains aluminum or if the catalyst does not contain aluminum or it contains an insufficient quantity of aluminum, then there is additionally employed an organometallic compound containing aluminum.

In view of the reduced activity of conventional Ziegler catalysts in the copolymerization of α-olefins, particularly at solution polymerization temperatures, it is indeed surprising that the aforementioned catalytic reaction product is a high efficiency catalyst capable of producing more than a million pounds of olefin polymer or copolymer per pound of transition metal under such polymerization conditions. Accordingly, olefin polymers produced in accordance with the foregoing process generally contain lower amounts of catalyst residues than polymers produced in the presence of conventional catalyst even after subjecting such conventionally produced polymers to catalyst removal treatments. Further, these catalytic reaction products provide polymers produced therefrom with a relatively broader molecular weight distribution as illustrated by improved high shear melt flow properties ($I_{10}/I_2$) than do corresponding catalysts without the anhydrous zinc compound.

DETAILED DESCRIPTION OF THE PREFERRED EMBODIMENTS

The present invention is most advantageously practiced in a polymerization process wherein an α-olefin is polymerized, generally in the presence of hydrogen as a molecular weight control agent, in a polymerization zone containing an inert diluent and the catalytic reaction product as hereinbefore described. Especially advantageous is the copolymerization of ethylene and higher α-olefins using the catalytic reaction product of this invention. The foregoing polymerization process is most beneficially carried out under inert atmosphere and relatively low temperature and pressure, although very high pressures are optionally employed.

Olefins which are suitably homopolymerized or copolymerized in the practice of this invention are generally the aliphatic α-monoolefins or α-diolefins having from 2 to 18 carbon atoms. Illustratively, such α-olefins can include ethylene, propylene, butene-1, pentene-1, 3-methylbutene-1, 4-methylpentene-1, hexene-1, octene-1, dodecene-1, octadecene-1, 1,7-octadiene and the like. It is understood that α-olefins may be copolymerized with other α-olefins and/or with small amounts, e.g., up to about 25 weight percent based on the polymer, of other ethylenically unsaturated monomers such as styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene and up to 50, especially from about 0.1 to about 40, weight percent of at least one other α-olefin such as, for example, propylene, butene-1, hexene-1, octene-1, 4-methylpentene-1, 1,7-octadiene or similar α-olefin or diolefin based on total monomer.

Suitable zinc compounds which can be advantageously employed include those zinc compounds represented by the formula $R_2Zn$ wherein R is a hydrocarbyl group having from 1 to about 20, preferably 1 to about 10, carbon atoms. Particularly suitable zinc compounds include, for example, diethyl zinc, diphenyl zinc, dimethyl zinc, mixtures thereof and the like.

Advantageously, the tetravalent titanium compound is represented by the empirical formula: $TiX_n(OR)_{4-n}$ wherein X is a halogen, particularly chlorine or bromine, R is an alkyl or an aryl group having from 1 to 12 carbon atoms and n has a value of 0 to 4. Such titanium compounds are preferably derived from the titanium halides wherein one or more of the halogen atoms are replaced by an alkoxy or aryloxy group. Exemplary of such compounds include tetra-n-butoxy titanium, di-n-butoxy titanium dichloride, monoethoxy titanium trichloride, tetraphenoxytitanium and the like.

The preferred organomagnesium component is a hydrocarbon soluble complex illustrated by the formula $MgR''_2 \cdot xAlR''_3$ wherein R'' is independently hydrocarbyl or hydrocarbyloxy, and x is about 0.001 to 10, especially from about 0.015 to about 0.25. This complex is prepared by reacting particulate magnesium such as magnesium turnings or magnesium granules, magnesium powder and the like with about a stoichiometric amount of hydrocarbyl halide, illustrated as R'X. The resulting hydrocarbon insoluble $MgR''_2$ is solubilized by adding an organometallic compound such as $AlR''_3$. The amount of organometallic compound which is added to the $MgR''_2$ to form the organomagnesium complex should be enough to solubilize a significant amount (at least about 5 weight percent) of $MgR''_2$. It is preferred to solubilize at least 50 weight percent of the $MgR''_2$ and it is especially preferred to solubilize all the $MgR''_2$. In order to obtain maximum catalyst efficiency at polymerization temperatures above 180° F., it is desirable to minimize the amount of aluminum in the complex as well as in the total catalyst. Accordingly, for catalysts having Al:Ti atomic ratios less than 120:1, it is desirable to have a Mg:Al atomic ratio more than 0.3:1, preferably from about 0.5:1 to 10:1. In suitable complexes, organometallic compounds (other than $AlR''_3$) which also solubilize the organomagnesium compound in hydrocarbons are employed in beneficial amounts, usually an amount sufficient to produce an atomic ratio of 0.01:1 to 10:1 of metal of the organometallic compounds to magnesium. Examples of such other optionally employed organometallic compounds include zinc dialkyls such as diethyl zinc, boron trialkyls such as boron triethyl, alkyl silances such as dimethyl silane and tetraethyl silane, alkyl tin and alkyl phosphorous compounds.

If $ZnR_2$ is present as a solubilizing agent for the $MgR_2$ then upon addition of the halogenating agent the $ZnR_2$ will act in a similar manner as the $MgR_2$ and be converted to $ZnX_2$. This is not preferred since maximum molecular weight distribution broadening based on total zinc occurs in the absence of $ZnX_2$.

Alternative to the aforementioned solubilized magnesium complexes, it is also advantageous to employ organomagnesium compounds as the organomagnesium component. Such compounds, although often insoluble in hydrocarbons, are suitably employed. These compounds can be rendered soluble in hydrocarbon by addition of ether, amine, etc., although such solubilizing agents often reduce the activity of the catalyst. Recently, such compounds have been made hydrocarbon soluble without using such catalyst poisons, e.g., as taught in U.S. Pat. No. 3,646,231. The more recent hydrocarbon soluble organomagnesium compounds are the most desirable if an organomagnesium compound is to be used as the organomagnesium component.

Preferably the organomagnesium compound is a hydrocarbon soluble dihydrocarbylmagnesium such as the magnesium dialkyls and the magnesium diaryls. Exemplary suitable magnesium dialkyls include particularly n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-n-octyl magnesium and others wherein the alkyl has from 1 to about 20 carbon atoms. Exemplary suitable magnesium diaryls include diphenylmagnesium, dibenzylmagnesium, and ditolylmagnesium. Suitable organomagnesium compounds include alkyl and aryl magnesium alkoxides and aryloxides and aryl and alkyl magnesium halides with the halogen-free organomagnesium compounds being more desirable.

The preferred halide sources are the active non-metallic halides of the formula set forth hereinbefore including hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, i.e., as easily lost to another compound, as the halogen of sec-butyl chloride and preferably as active as t-butyl chloride. In addition to the organic monohalides, it is understood that organic dihalides, trihalides and other polyhalides that are active, as defined hereinbefore, are also suitably employed. Examples of preferred active non-metallic halides include hydrogen chloride, hydrogen bromide, t-butyl chloride, t-amyl bromide, allyl chloride, benzyl chloride, crotyl chloride, methylvinyl carbinyl chloride, α-phenylethyl bromide, diphenyl methyl chloride and the like. Most preferred are hydrogen chloride, t-butyl chloride, allyl chloride and benzyl chloride.

Suitable metallic halides as set forth by formula hereinbefore are organometallic halides and metal halides wherein the metal is in Group IIIA or IVA of Mendeleev's Periodic Table of Elements. Preferred metallic halides are aluminum halides of the formula $AlR_{3-a}X_a$ wherein each R is independently hydrocarbyl as hereinbefore defined such as alkyl, X is a halogen and a is a number from 1 to 3. Most preferred are alkylaluminum halides such as ethylaluminum sesquichloride, diethylaluminum chloride, ethylaluminum dichloride, and diethylaluminum bromide, with ethylaluminum dichloride being especially preferred. Alternatively, a metal halide such as aluminum trichloride or a combination of aluminum trichloride with an alkyl aluminum halide or a trialkyl aluminum compound may be suitably employed.

It is understood that the organic moieties of the aforementioned organomagnesium, e.g., R'', and the organic moieties of the halide source, e.g., R and R', are suitably any other organic radical provided that they do not contain functional groups that poison conventional Ziegler catalysts. Preferably such organic moieties do not contain active hydrogen, i.e., those sufficiently active to react with the Zerewitinoff reagent.

As used herein, hydrocarbyl and hydrocarbyloxy are monovalent hydrocarbon radicals. Preferably, hydrocarbyl is alkyl, cycloalkyl, aryl, aralkyl, alkenyl and similar hydrocarbon radicals having 1 to 20 carbon atoms, with alkyl having 1 to 10 carbon atoms being especially preferred. Likewise, preferably, hydrocarbyloxy is alkoxy, cycloalkyloxy, aryloxy, aralkyloxy, alkenyloxy and similar oxyhydrocarbon radicals having 1 to 20 carbon atoms, with alkyloxy having 1 to 10 carbon atoms being preferred. In order to maximize catalyst efficiency, the catalyst is prepared by mixing the components of the catalyst in an inert liquid diluent in the following especially preferred order: organomagnesium compound, halide source, aluminum compound if required, titanium compound or complex and zinc compound. However, the zinc compound, additional aluminum compound or both can be added as a separate side stream which comes into contact with the other components of the catalyst composition prior to entry into the polymerization reactor. Also the zinc compound, additional aluminum compound or both may be fed separately to the reactor where it or they only come into contact with the other catalyst components inside the reactor.

The foregoing catalyst components are combined in proportions sufficient to provide atomic ratios as previously mentioned.

In cases wherein neither the organomagnesium component nor the halide source contains aluminum, it is necessary to include in the total catalyst an aluminum compound such as an alkyl aluminum compound, e.g., a trialkyl aluminum, an alkyl aluminum halide or an aluminum halide. If polymerization temperatures below 180° C. are employed, the atomic ratios of Al:Ti may be from about 0.1:1 to about 2000:1, preferably from 1:1 to about 200:1. However, when polymerization temperatures above 180° C. are employed, the aluminum compound is used in proportions such that the Mg:Al ratio is more than 0.3:1, preferably from 0.5:1 to 10:1, and Al:Ti ratio is less than 120:1, preferably less than 50:1. It is understood, however, that the use of very low amounts of aluminum necessitates the use of high purity solvents or diluents in the polymerization zone. Further, other components present in the zone should be essentially free of impurities which react with aluminum alkyls. Otherwise, additional quantities of an organometallic compound as previously described, preferably an organoaluminum compound, must be used to react with such impurities. Moreover, it is understood that in the catalyst the aluminum compound should be in the form of trialkyl aluminum or alkyl aluminum halide provided that the alkyl aluminum halide is substantially free of alkyl aluminum dihalide.

The foregoing catalytic reaction is preferably carried out in the presence of an inert diluent. The concentrations of catalyst components are preferably such that when the essential components of the catalytic reaction product are combined, the resultant slurry is from about 0.005 to about 1.0 molar (moles/liter) with respect to magnesium. By way of an example of suitable inert organic diluents can be mentioned liquified ethane, propane, isobutane, n-butane, n-hexane, the various isomeric hexanes, isooctane, paraffinic mixtures of alkanes having from 6 to 12 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about −50° to about 200° C. Also included as suitable inert diluents are benzene, toluene, ethylbenzene, cumene, decalin and the like.

Mixing of the catalyst components to provide the desired catalytic reaction product is advantageously carried out under an inert atmosphere such as nitrogen, argon or other inert gas at temperatures in the range from about −100° to about 200° C., preferably from about 0° to about 100° C. The period of mixing is not considered to be critical as it is found that a sufficient catalyst composition most often occurs within about 1 minute or less. In the preparation of the catalytic reaction product, it is not necessary to separate hydrocarbon soluble components from hydrocarbon insoluble components of the reaction product.

In the polymerization process employing the aforementioned catalytic reaction product, polymerization is effected by adding a catalytic amount of the above catalyst composition to a polymerization zone containing α-olefin monomer(s), or vice versa. The polymerization zone is maintained at temperatures in the range from about 0° to about 300° C., preferably at solution polymerization temperatures, e.g., from about 130° to about 250° C. for a residence time of about a few seconds to several days, preferably 15 seconds to 2 hours. It is generally desirable to carry out the polymerization in the absence of moisture and oxygen and a catalytic amount of the catalytic reaction product is generally within the range from about 0.0001 to about 0.1 millimoles titanium per liter of diluent. It is understood, however, that the most advantageous catalyst concentration will depend upon polymerization conditions such as temperature, pressure, solvent and presence of catalyst poisons and that the foregoing range is given to obtain maximum catalyst yields in weight of polymer per unit weight of titanium. Generally in the polymerization process, a carrier which may be an inert organic diluent or solvent or excess monomer is employed. In order to realize the full benefit of the high efficiency of the catalyst of the present invention, care must be taken to avoid oversaturation of the solvent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitably as defined hereinbefore.

The polymerization pressures preferably employed are relatively low, e.g., from about 50 to about 1000 psig, especially from about 100 to about 700 psig. However, polymerization within the scope of the present invention can occur at pressures from atmospheric up to pressures determined by the capabilities of the polymerization equipment. During polymerization it is desirable to stir the polymerization recipe to obtain better temperature control and to maintain uniform polymerization mixtures throughout the polymerization zone.

In order to optimize catalyst yields in the polymerization of ethylene, it is preferable to maintain an ethylene concentration in the solvent in the range of from about 1 to about 10 weight percent, most advantageously from about 1.2 to about 2 weight percent. To achieve this, when an excess of ethylene is fed into the system, a portion of the ethylene can be vented.

Hydrogen can be employed in the practice of this invention to control the molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalytic reaction product in any conventional manner, preferably by bringing the catalytic reaction product and monomer(s) together with intimate agitation provided by suitable stirring or other means. Agitation can be continued during polymerization, or in some instances, the polymerization can be allowed to remain unstirred while the polymerization takes place. In the case of more rapid reactions with more active catalysts, means can be provided for refluxing monomer(s) and solvent, if any of the latter is present, thus removing the heat of reaction. In any event adequate means should be provided for dissipating the exothermic heat of polymerization. If desired, the monomer can be brought in the vapor phase into contact with the catalytic reaction product, in the presence or absence of liquid material. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent of the types conventionally employed for deactivating Ziegler catalysts. The resultant polymer is found to contain insignificant amounts of catalyst residue and to possess a relatively broad molecular weight distribution.

The following examples are given to illustrate the inventions, and should not be construed as limiting its scope. All percentages are by weight and all parts are by molar or atomic ratio unless otherwise indicated.

In the following examples, the melt index values $I_2$ and high shear melt index values $I_{10}$ were determined by ASTM D 1238-70 and the density values were determined by ASTM D 1248.

EXAMPLES 1-8 and COMPARATIVE EXPERIMENTS A and B

A Preparation of Anhydrous $MgCl_2$

To 39.68 ml (0.025 moles) of 0.63 M di-n-hexyl magnesium was added 460.32 ml of 2,2,4-trimethylpentane (isooctane). Anhydrous electronic grade HCl was passed through the solution until a light yellow color persisted. Excess HCl was stripped from the mixture by passing dry $N_2$ through the solution.

B. Preparation of the Catalyst Composition

The catalyst composition was prepared by adding with stirring under a nitrogen atmosphere to a 4-ounce (118.28 cc) serum bottle the following components in the following order:

| | |
|---|---|
| (87.40 -x-y) | ml of 2,2,4-trimethylpentane |
| 12.0 | ml of 0.05 M $MgCl_2$ as prepared above |
| x | ml of 0.85 M diethyl zinc (DEZ) |
| y | ml of 1.00 M triethyl aluminum (ATE) |
| 0.60 | ml of 0.025 M terta-isopropyl titanate $(Ti(OiPr)_4)$ |
| 100.0 ml | |

The temperature of the serum bottles was maintained at ambient temperature (about 22° C.) Depending on the ratio of the concentration of DEZ to ATE, the catalyst was observed to darken over a period of about 10 minutes. After this time, there was no significant change in catalyst color.

The quantities of DEZ and ATE and the atomic ratios of the catalyst components are given in the following Table I.

TABLE I

| Example and Comparative Experiment Number | x ml | y ml | ATOMIC RATIO | | | | | |
|---|---|---|---|---|---|---|---|---|
| | | | Mg:Ti | Zn:Mg | Zn:Ti | Al:Ti | Zn:Al | *XsCl:Al |
| 1 | 1.32 | 0.15 | 40:1 | 1.88:1 | 75:1 | 10:1 | 7.5:1 | 0.01:1 |
| 2 | 1.32 | 0.30 | 40:1 | 1.88:1 | 75:1 | 20:1 | 3.8:1 | 0.005:1 |
| 3 | 0.88 | 0.75 | 40:1 | 1.25:1 | 50:1 | 50:1 | 1:1 | 0.002:1 |
| 4 | 0.88 | 0.30 | 40:1 | 1.25:1 | 50:1 | 20:1 | 2.5:1 | 0.005:1 |
| 5 | 0.88 | 0.375 | 40:1 | 1.25:1 | 50:1 | 25:1 | 2:1 | 0.004:1 |
| A | 0 | 0.75 | 40:1 | 0 | 0:1 | 50:1 | 0 | 0.002:1 |
| 6 | 0.88 | 0.30 | 40:1 | 1.25:1 | 50:1 | 20:1 | 2.5:1 | 0.005:1 |
| 7 | 0.88 | 0.30 | 40:1 | 1.25:1 | 50:1 | 20:1 | 2.5:1 | 0.005:1 |
| 8 | 1.32 | 0.15 | 40:1 | 1.88:1 | 75:1 | 10:1 | 7.5:1 | 0.01:1 |
| B | 0 | 0.75 | 40:1 | 0 | 0:1 | 50:1 | 0 | 0.002:1 |

*XsCl = excess chloride

C. Polymerization (Ex. 1-5 and Comparative Experiment A)

A stirred batch reactor containing 2 liters of 2,2,4-trimethylpentane (isooctane) was heated to 150° C. The solvent vapor pressure was 40 psig. To this was added 10 psig of hydrogen and 130 psig of ethylene for a total reactor pressure of 180 psig. An amount of the above catalyst was injected into the reactor (10 ml=0.0015 m Moles Ti), and the reactor pressure was maintained constant at 180 psig with ethylene. The total reaction time was 30 minutes. The quantities of catalyst and polymerization results are given in Table II.

D. Polymerization (Ex. 6-8 and Comparative Experiment B)

The catalyst preparation was identical to that given above. In these examples, the polymerization was conducted at 80° C. (slurry conditions). The solvent vapor pressure was 0 psig and 80 psig of hydrogen was added. To this was added 120 psig of ethylene for a total reactor pressure of 200 psig. All other parameters are the same. After reacting for 30 minutes, the ethylene flow was discontinued and excess ethylene vented off. The reactor was refilled with nitrogen, then heated for one hour at 150° C. to solubilize the polymer for ease of sample removal. The results of these examples are given in Table II.

When comparing two samples of polymer, it is necessary for the melt indices ($I_2$) of the samples to be similar since the $I_{10}/I_2$ ratio is inversely proportional to the melt index. The value of the $I_{10}/I_2$ ratio is a reflection of the molecular weight distribution as indicated by the high shear melt flow properties of the polymer since a broad molecular weight distribution is indicated by a large $I_{10}/I_2$ ratio at comparable $I_2$ values. A polymer with a larch $I_{10}/I_2$ ratio processes well at high shear rates while a small ratio indicates a relatively narrow distribution and a polymer which processes poorly at high shear rates.

A polymer which processes easily at high shear rates is desirable in film resins because this provides for improved film fabrication conditions. In addition, a resin which processes easily at high shear rates is desirable in injection molding resins due to improved rheological (i.e., processing) properties.

TABLE II

| Example and Comparative Experiment Number | Quantity of Catalyst ml | Polymer Yield grams | Catalyst Efficiency $M^4$ g Polymer/g Ti | MELT INDEX | | | Peak $MW^1$ | $M_w/M_n^2$ | Density g/cc |
|---|---|---|---|---|---|---|---|---|---|
| | | | | $I_2$ | $I_{10}$ | $I_{10}/I_2$ | | | |
| 1 | 15 | 129 | 1.20 | 0.46 | 6.77 | 14.72 | 42,500 | 4.29 | 0.9613 |
| 2 | 10 | 91 | 1.27 | 0.91 | 9.76 | 10.73 | N.D.[3] | N.D. | 0.9608 |
| 3 | 10 | 131 | 1.82 | 1.21 | 13.70 | 11.32 | N.D. | N.D. | 0.9640 |
| 4 | 25 | 123 | 0.68 | 1.18 | 11.80 | 10.00 | 32,000 | 7.09 | 0.9622 |
| 5 | 10 | 108 | 1.50 | 1.29 | 15.53 | 12.04 | N.D. | N.D. | 0.9637 |
| A | 10 | 164 | 2.28 | 0.47 | 5.75 | 12.23 | N.D. | N.D. | 0.9605 |
| 6 | 25 | 122 | 0.68 | 0.29 | 4.36 | 15.03 | 33,500 | 5.72 | 0.9603 |
| 7 | 25 | 91 | 0.51 | 0.32 | 5.18 | 16.19 | 30,900 | 10.54 | 0.9609 |
| 8 | 25 | 96 | 0.42 | 0.42 | 7.00 | 16.67 | 34,000 | 9.02 | 0.9614 |

TABLE II-continued

| Example and Comparative Experiment Number | Quantity of Catalyst ml | Polymer Yield grams | Catalyst Efficiency $M^4$ g Polymer/g Ti | MELT INDEX $I_2$ | $I_{10}$ | $I_{10}/I_2$ | Peak MW[1] | $M_w/M_n$[2] | Density g/cc |
|---|---|---|---|---|---|---|---|---|---|
| B | 30 | 132 | 0.61 | 0.35 | 4.42 | 12.63 | N.D. | N.D. | 0.9589 |

[1]Peak molecular weight = the most frequently occurring molecular weight of all polymer species present as weight average molecular weight determined by gel permeation chromatography.
[2]$M_w/M_n$ = weight average molecular weight divided by the number average molecular weight as determined by gel permeation chromatography.
[3]N.D. = not determined.
[4]M = million.

EXAMPLES 9–15 and COMPARATIVE EXPERIMENT C

A. Catalyst Preparation

The catalyst composition was prepared by adding with stirring under a nitrogen atmosphere to a 4-ounce (118.28 cc) serum bottle the following components in the following order:

(97.53 -x-y) ml of 2,2,4-trimethylpentane
0.97 ml of 0.63 M n-butyl ethyl magnesium (BEM)
0.90 ml of 0.50 M tin (IV) chloride (SnCl$_4$)
x ml of 0.85 M diethyl zinc (DEZ)
y ml of 1.00 M triethyl aluminum (ATE)
0.60 ml of 0.025 M tetraisopropyl titanate (Ti(OiPr)$_4$)
_____
100.00 ml The order of addition in this case is extremely important since it is necessary to convert the BEM to MgCl$_2$ with the SnCl$_4$ before adding the other components. When SnCl$_4$ is employed as the halide source, it is necessary to add a small amount, at least 1 atom of Al per atom of Ti, of an aluminum compound before adding the titanium source in order to form an active catalyst.

The quantities of DEZ and ATE and the atomic ratios of the catalyst components are given in the following Table III.

TABLE III

| Example and Comparative Experiment Number | x ml | y ml | ATOMIC RATIO | | | | | |
|---|---|---|---|---|---|---|---|---|
| | | | Mg:Ti | Zn:Mg | Zn:Ti | Al:Ti | Zn:Al | *XsCl:Al |
| 9 | 0.88 | 0.75 | 40:1 | 1.25:1 | 50:1 | 50:1 | 1:1 | 0.8:1 |
| 10 | 0.44 | 0.75 | 40:1 | 0.63:1 | 25:1 | 50:1 | 0.5:1 | 0.8:1 |
| 11 | 0.18 | 0.75 | 40:1 | 0.25:1 | 10:1 | 50:1 | 0.2:1 | 0.8:1 |
| 12 | 1.32 | 0.30 | 40:1 | 1.88:1 | 75:1 | 20:1 | 3.75:1 | 2:1 |
| 13 | 1.32 | 0.75 | 40:1 | 1.88:1 | 75:1 | 50:1 | 1.5:1 | 0.8:1 |
| 14 | 0.88 | 0.30 | 40:1 | 1.25:1 | 50:1 | 20:1 | 2.5:1 | 2:1 |
| 15 | 0.88 | 0.49 | 40:1 | 1.25:1 | 50:1 | 27:1 | 1.85:1 | 1.5:1 |
| C | 0 | 0.75 | 40:1 | 0 | 0:1 | 50:1 | 0 | 0.8:1 |

*XsCl = excess chloride

B. Polymerization

Each of the catalysts were employed to polymerize ethylene employing the conditions for Examples 1–5. The results are given in Table IV.

In Table IV, comparative experiment C can most closely be compared with example 10. There is about 1.2 $I_{10}/I_2$ units of improved process ability at this higher melt index value. Thus, the resin from example 10 shows more desirable film and injection molding properties than the resin in comparative experiment C.

TABLE IV

| Example and Comparative Experiment Number | Quantity of Catalyst ml | Polymer Yield grams | Catalyst Efficiency $N^4$ g Polymer/g Ti | MELT INDEX $I_2$ | $I_{10}$ | $I_{10}/I_2$ | Peak MW[1] | $M_w/M_n$[2] | Density g/cc |
|---|---|---|---|---|---|---|---|---|---|
| 9 | 15 | 148 | 1.37 | 1.16 | 12.15 | 10.47 | 34,800 | 4.5 | 0.9638 |
| 10 | 10 | 156 | 2.17 | 1.84 | 18.73 | 10.18 | 31,900 | 3.12 | 0.9641 |
| 11 | 6.7 | 141 | 2.94 | 1.29 | 12.10 | 9.38 | N.D.[3] | N.D. | 0.9633 |
| 12 | 40 | 92 | 0.32 | 1.57 | 17.69 | 11.27 | 25,900 | 6.22 | 0.9662 |
| 13 | 6.7 | 83 | 1.73 | 1.09 | 11.50 | 10.55 | 35,200 | 4.59 | 0.9639 |
| 14 | 6.5 | 66 | 0.14 | 1.82 | 20.71 | 11.38 | 22,600 | 6.35 | 0.9671 |
| 15 | 35 | 111 | 0.44 | 0.98 | 10.37 | 10.58 | 31,100 | 6.43 | 0.9640 |
| C | 15 | 180 | 1.67 | 2.94 | 25.88 | 8.80 | N.D. | N.D. | 0.9644 |

[1]Peak molecular weight = the most frequently occurring molecular weight of all polymer species present as weight average molecular weight determined by gel permeation chromatography.
[2]$M_w/M_n$ = weight average molecular weight divided by the number average molecular weight as determined by gel permeation chromatography.
[3]N.D. = not determined.
[4]M = million.

The catalyst composition was also employed in a continuous operation. The following examples are given to illustrate possible uses of the invention in a continuous process.

EXAMPLES 16–21

A. Catalyst Preparation

The catalyst composition was prepared by adding with stirring under a nitrogen atmosphere to a 30-liter catalyst vessel the following components in the following order:

| | Isopar ® E* |
|---|---|
| 40 | parts magnesium alkyl (n-butyl-sec-butyl Mg or di-n-hexyl Mg) |
| 82 | parts anhydrous hydrogen chloride (HCl) |
| 1 | part tetraisopropyl titanate (Ti(OiPr)$_4$) |
| 24 | parts triethylaluminum (ATE) |
| 24 | parts diethyl zinc (DEZ) |

*The Isopar ® E was employed as a diluent in a quantity which provided 0.000132 parts by weight of Ti per part by weight of catalyst composition.

The order of addition is important since magnesium alkyls can over reduce the Ti(OiPr)$_4$. Also, if DEZ is present when the HCl is added, it will fall out of solution as the metal chloride. It is preferred that there be no zinc chloride present in the catalyst in order to form the most desirable product.

B. Polymerization

A spherical, 50-gallon, constant-stirred vessel with ethylene feed to the bottom was used as the reactor. Isopar ® E, a mixture of C$_8$–C$_{12}$ saturated hydrocarbons, was used as the solvent. Reactor temperature was maintained at 190° C., ±2° C., and the reactor pressure was maintained at 500 psig throughout the runs. Hydrogen was added as a molecular weight control. Residence time for the catalyst in the reactor was 50 minutes. The catalyst efficiency and polymerization results are given in Table V.

EXAMPLES 22–31

A. Catalyst Preparation

The catalyst composition was prepared by adding with stirring under a nitrogen atmosphere to a 30-liter catalyst vessel the following components in the following order:

| | Isopar ® E* |
|---|---|
| 40 | parts magnesium alkyl (n-butyl-sec-butyl Mg or di-n-hexyl Mg) |
| 82 | parts anhydrous hydrogen chloride (HCl) |
| 1 | part tetraisopropyl titanate (Ti(OiPr)$_4$) |
| 18 | parts triethylaluminum (ATE) |

*The Isopar ® E was employed as a diluent in a quantity which provides 0.000132 parts by weight of Ti per part by weight of catalyst composition.

Again the order of addition is important for the same reasons given for Examples 16–21.

The DEZ is placed in a second vessel and pumped so that it interacts with the above prepared catalyst at the time it enters the polymerization reactor. This is accomplished by employing dual catalyst feed lines which come together just prior to entering the reactor. In this manner, the amount of DEZ entering the reactor, and therefore the ratio of Zn:Ti and Zn:Al, can be varied independently of the catalyst make-up.

B. Polymerization

Each of the catalysts were employed to polymerize ethylene using the conditions for Examples 16–21. The results are given in Table V.

COMPARATIVE EXPERIMENTS D–H

The catalyst of Examples 22–31 was employed using the polymerization procedure of Examples 16–21, i.e., no zinc compound was employed. The results are given in Table V.

The following comparisons can be made on the continuous scale samples based on melt index. Comparative experiment D can be compared with Example 16. The amount of improvement for Example 16 is almost 5 $I_{10}/I_2$ units. Another indication of improved process ability is the fact that the melt index of the two samples is nearly identical, but the peak molecular weight of Example 16 is lower, indicating more material is present in the high molecular weight region. This will lead to improved properties similar to a higher molecular weight material but still possess the ease of processing provided with lower molecular weight polymers.

Comparative experiment E can be compared with Examples 22 and 27. The increase in the $I_{10}/I_2$ ratio was 1.3 and 3.2 units, respectively. In both cases the peak molecular weight for the examples was much lower than for the comparative experiment, indicating more high molecular weight material present.

Comparative experiment F may be compared with examples 19, 26 and 29. The amount of high shear improvement was 0.1, 0.4 and 2.0 $I_{10}/I_2$ units respectively, with the peak molecular weights again being lower for the examples.

Comparative experiment G can be compared with examples 20 and 24. The amount of improved process ability was 0.5 and 0.7 $I_{10}/I_2$ units, respectively.

Comparative experiment H can be compared with example 21. The $I_{10}/I_2$ increase was 0.2 units.

The examples in Table V would all show superior film and injection molding properties when compared to the comparative experiments also listed in Table V.

TABLE V

| Example and Comparative Experiment Number | Mg:Ti | Zn:Mg | Zn:Ti | Zn:Al | Al:Ti | **XsCl:Al | $I_2$ | $I_{10}$ | $I_{10}/I_2$ | Catalyst Efficiency $\overline{M}^3$ g Polymer/g Ti | Peak MW[1] | $M_w/M_n$[2] | Density g/cc |
|---|---|---|---|---|---|---|---|---|---|---|---|---|---|
| 16 | 40:1 | 0.45:1 | 18:1 | 0.75:1 | 24:1 | 0.08:1 | 0.70 | 11.06 | 15.80 | 0.85 | 29,500 | 8.37 | 0.9596 |
| 17 | 40:1 | 0.45:1 | 18:1 | 0.75:1 | 24:1 | 0.08:1 | 3.04 | 29.91 | 9.84 | 0.44 | 26,900 | 6.45 | 0.9615 |
| 18 | 40:1 | 0.45:1 | 18:1 | 0.75:1 | 24:1 | 0.08:1 | 9.71 | 75.35 | 7.76 | 0.64 | 22,600 | 4.56 | 0.9634 |
| 19 | 40:1 | 0.45:1 | 18:1 | 0.75:1 | 24:1 | 0.08:1 | 14.85 | 107.82 | 7.26 | 0.80 | 22,000 | 4.39 | 0.9634 |
| 20 | 40:1 | 0.45:1 | 18:1 | 0.75:1 | 24:1 | 0.08:1 | 30:49 | 209.23 | 6.86 | 0.79 | 20,200 | 2.98 | 0.9648 |
| 21 | 40:1 | 0.45:1 | 18:1 | 0.75:1 | 24:1 | 0.08:1 | 79:51 | 489.2 | 6.15 | 0.88 | 17,200 | 3.25 | 0.9670 |
| 22 | 40:1 | 0.19:1 | 7.5:1 | 0.54:1 | 14:1 | 0.14:1 | 2.15 | 21.33 | 9.92 | 0.64 | 26,300 | 6.02 | 0.9583 |
| 23 | 40:1 | 0.28:1 | 11.2:1 | 0.8:1 | 14:1 | 0.14:1 | 3.00 | 28.82 | 9.61 | 0.64 | 29,100 | 4.42 | 0.9599 |
| 24 | 40:1 | 0.30:1 | 12:1 | 0.86:1 | 14:1 | 0.14:1 | 33.19 | 235.27 | 7.09 | 0.53 | N.D.* | N.D. | 0.9655 |
| 25 | 40:1 | 0.37:1 | 14.8:1 | 1.06:1 | 14:1 | 0.14:1 | 7.96 | 72.32 | 9.09 | 0.42 | 22,400 | 3.44 | 0.9644 |

TABLE V-continued

| Example and Comparative Experiment Number | Mg:Ti | Zn:Mg | Zn:Ti | Zn:Al | Al:Ti | **XsCl:Al | $I_2$ | $I_{10}$ | $I_{10}/I_2$ | Catalyst Efficiency $\overline{M}^3$ g Polymer/g Ti | Peak MW[1] | $M_w/M_n$[2] | Density g/cc |
|---|---|---|---|---|---|---|---|---|---|---|---|---|---|
| 26 | 40:1 | 0.48:1 | 19:1 | 1.36:1 | 14:1 | 0.14:1 | 12.05 | 93.87 | 7.51 | 0.57 | 23,300 | 4.57 | 0.9605 |
| 27 | 40:1 | 0.53:1 | 21.3:1 | 1.52:1 | 14:1 | 0.14:1 | 2.05 | 24.24 | 11.82 | 0.64 | 25,800 | 5.60 | 0.9600 |
| 28 | 40:1 | 0.53:1 | 21.3:1 | 1.52:1 | 14:1 | 0.14:1 | 26.23 | 201.76 | 7.69 | 0.66 | 20,200 | 3.47 | 0.9672 |
| 29 | 40:1 | 0.65:1 | 25.8:1 | 1.84:1 | 14:1 | 0.14:1 | 10.73 | 98.46 | 9.18 | 0.38 | 19,600 | 5.45 | 0.9643 |
| 30 | 40:1 | 0.69:1 | 27.7:1 | 1.98:1 | 14:1 | 0.14:1 | 6.91 | 67.19 | 9.72 | 0.67 | 21,800 | 6.90 | 0.9584 |
| 31 | 40:1 | 0.74:1 | 29.5:1 | 2.11:1 | 14:1 | 0.14:1 | 29.90 | 220.97 | 7.38 | 0.58 | 19,300 | 3.46 | 0.9680 |
| D | 40:1 | 0 | 0 | 0 | 14:1 | 0.14:1 | 0.69 | 7.57 | 10.97 | N.D. | 32,800 | 11.94 | 0.9611 |
| E | 40:1 | 0 | 0 | 0 | 14:1 | 0.14:1 | 1.84 | 15.90 | 8.64 | N.D. | 33,700 | 4.74 | 0.9595 |
| F | 40:1 | 0 | 0 | 0 | 14:1 | 0.14:1 | 12.19 | 86.94 | 7.13 | N.D. | 25,600 | 4.56 | 0.9658 |
| G | 40:1 | 0 | 0 | 0 | 14:1 | 0.14:1 | 38.83 | 245.39 | 6.32 | N.D. | 21,100 | 3.58 | 0.9661 |
| H | 40:1 | 0 | 0 | 0 | 14:1 | 0.14:1 | 84:18 | 493.74 | 5.92 | N.D. | 17,400 | 3.23 | 0.9704 |

*N.D. = not determined
**XsCl = excess chloride
[1]Peak molecular weight = the most frequently occurring molecular weight of all polymer species present as weight average molecular weight determined by gel permeation chromatography.
[2]$M_w/M_n$ = weight average molecular weight divided by the number average molecular weight as determined by gel permeation chromatography.
[3]$\overline{M}$ = million.

EXAMPLES 32-42

A. Catalyst Preparation

The catalyst composition was prepared by adding with stirring under a nitrogen atmosphere to a 50-gallon catalyst vessel the following components in the following order:

| Isopar ® E* | |
|---|---|
| 40 | parts of n-butyl-sec-butyl magnesium |
| 82 | parts of anhydrous hydrogen chloride (HCl) |
| 1 | part of tetraisopropyl titanate (Ti(OiPr)$_4$) |
| 20 | parts of diethyl zinc (DEZ) |

*The Isopar ® E was employed as a diluent in a quantity which provided 0.000132 parts by weight of Ti per part by weight of catalyst composition.

The order of addition is important as has been previously discussed.

In a separate 10-gallon vessel, a 0.15 weight percent solution of ATE was prepared by diluting 1 part by weight of 15% ATE with 99 parts by weight of solvent. This solution was side-streamed into the reactor along with the catalyst composition to serve as the cocatalyst. By side-streaming the ATE, the catalyst efficiency can be optimized and the ratio of Al:Ti or Al:Zn can be varied independently of the catalyst make-up. For these runs, the ATE level was optimized at approximately 15:1 Al:Ti.

B. Polymerization

A cylindrical, 25-gallon, constant-stirred vessel with separate ethylene and catalyst feed to the bottom was used as the reactor. Isopar ® E, a mixture of $C_8$-$C_{12}$ saturated hydrocarbons, was used as the solvent with a solvent flow of 700 pounds per hour. Reactor temperature was maintained at 190° C., ±2° C., and the reactor pressure was maintained at 500 psig throughout the runs. Ethylene conversion ranged from 84-95% with a production rate of 85 ±5 pounds per hour. Hydrogen was added as a molecular weight control. Residence time for the catalyst in the reactor was 10 minutes. The catalyst efficiency was from 0.50 to 0.60 $\overline{M}\#$ polymer/# Ti. Polymerization results are given in Table VI.

COMPARATIVE EXPERIMENTS I-O

The catalyst of Examples 32-42 was employed except that the 20 parts of diethyl zinc was not added to the catalyst composition. Polymerization conditions were also identical to those of the preceding examples 32-42. When the ATE side-stream was optimized (again at ~15:1 Al:Ti), the catalyst efficiency was 0.75 to 1.0 M# polymer/# Ti. Polymerization results are given in Table VI.

For this example of a continuous process, the following comparisons can be made. Comparative experiment I can be compared to example 32, with #32 showing a high shear rate improvement of 4.5 $I_{10}/I_2$ units. Example 34 shows 5 $I_{10}/I_2$ of improvement when compared with comparative experiment J, while example 37 is 2.8 $I_{10}/I_2$ units improved over comparative experiment K. There is a difference of 1.7 $I_{10}/I_2$ units between example 38 and comparative experiment L. Comparative experiment M can be compared to example 39, with example 39 being 1.8 having $I_{10}/I_2$ units of improvement in high shear process ability. Example 42, when compared with comparative experiment N, is seen to be improved by 1.1 $I_{10}/I_2$ units.

TABLE VI

| Example and Comparative Experiment Number | $I_2$ | $I_{10}$ | $I_{10}/I_2$ |
|---|---|---|---|
| 32 | 0.73 | 9.87 | 13.52 |
| 33 | 1.08 | 15.20 | 14.07 |
| 34 | 1.26 | 15.91 | 12.63 |
| 35 | 1.70 | 19.02 | 11.19 |
| 36 | 2.17 | 23.30 | 10.74 |
| 37 | 2.26 | 23.46 | 10.38 |
| 38 | 5.89 | 52.15 | 8.85 |
| 39 | 8.83 | 76.25 | 8.64 |
| 40 | 9.73 | 80.71 | 8.29 |
| 41 | 10.33 | 81.26 | 7.87 |
| 42 | 16.19 | 126.01 | 7.78 |
| I | 0.84 | 7.62 | 9.02 |
| J | 1.36 | 12.29 | 9.04 |
| K | 2.51 | 19.00 | 7.57 |
| L | 4.81 | 34.48 | 7.17 |
| M | 7.73 | 53.23 | 6.89 |
| N | 18.27 | 121.82 | 6.67 |
| O | 36.10 | 238.70 | 6.61 |

We claim:

1. A process for the polymerization of one or more polymerizable α-olefins under conditions characteristic of Ziegler polymerization wherein the polymerization is conducted in the presence of, as a catalyst for said polymerization, a catalytic reaction product of (A) a tetravalent titanium compound represented by the formula $TiX_n(OR)_{4-n}$ wherein X is a halogen, R is an alkyl or an aryl group having from 1 to 12 carbon atoms and n has a value of 0 to 4;

(B) an anhydrous divalent zinc compound represented by the formula $R_2Zn$ wherein each R is independently a hydrocarbyl group having from 1 to about 20 carbon atoms;

(C) an organomagnesium component selected from (1) an organomagnesium compound or (2) a complex of an organomagnesium compound and an organometallic compound in an amount sufficient to solubilize the organomagnesium compound in a hydrocarbon solvent, said organomagnesium compound and said complex being represented respectively by the following formulas $MgR''_2$ and $MgR''_2 \cdot xMR''_y$ wherein each R'' is independently a hydrocarbyl group having from 1 to 20 carbon atoms; M is a metal selected from Al, Zn, Si, Sn, B and P; y is the number of hydrocarbyl groups and corresponds to the valency of M and x is about 0.001 to 10 and (D) a halide source selected from (1) an active non-metallic halide, said non-metallic halide corresponding to the formula R'X wherein R' is hydrogen or a hydrocarbyl group such that the hydrocarbyl halide is at least as active as sec-butyl chloride and does not poison the catalyst and X is halogen or (2) a metallic halide corresponding to the formula $MR_{y-a}X_a$ wherein M is a metal of Group IIIA or IVA of Mendeleev's Periodic Table of Elements, R is a monovalent hydrocarbyl radical, X is halogen, y is a number corresponding to the valence of M and a is a number of 1 to y; provided that the proportions of the foregoing components of said catalytic reaction product being such that the atomic ratio of Zn:Mg is from about 0.02:1 to about 25:1, the atomic ratio of Zn:Al is from about 0.02:1 to about 50:1, the atomic ratio of Zn:Ti is from about 0.1:1 to about 200:1, the atomic ratio of excess X:Al is from about 0.0005:1 to about 10:1; and further provided that when the organomagnesium component and/or the halide source provides insufficient quantities of aluminum, there is also present an aluminum compound represented by the formula $AlR_{y'}X_{y''}$ wherein R and X are as defined above and y' and y'' each have a value of from zero to three with the sum of y' and y'' being three; and wherein the catalyst components are added in the order selected from (a) (C), (D), (B), aluminum compound, if required, and (A);

(b) (C), (D), (A), aluminum compound, if required, and (B) and provided that the halide source, (D), is other than a tin compound; and (c) (C), (D), aluminum compound, if required, (A), and (B).

2. The process of claim 1 wherein the anhydrous divalent zinc compound is a dialkyl zinc wherein each alkyl group independently has from 1 to about 10 carbon atoms, Component A is a tetraalkoxy titanium compound and wherein the atomic ratio of Zn:Mg is from about 0.1:1 to about 20:1, the atomic ratio of Zn:Al is from about 0.05:1 to about 20:1, the atomic ratio of Zn:Ti is from about 0.5:1 to about 100:1 and the atomic ratio of excess X:Al is from about 0.002:1 to about 2:1.

3. The process of claim 2 wherein the atomic ratio of Zn:Mg is from about 0.2:1 to about 10:1, the atomic ratio of Zn:Al is from about 0.1:1 to about 10:1, the atomic ratio of Zn:Ti is from about 1:1 to about 75:1 and the atomic ratio of excess X:Al is from about 0.01:1 to about 1.4:1.

4. The process of claim 3 wherein the organomagnesium compound is a dihydrocarbyl magnesium.

5. The process of claim 3 wherein the organomagnesium component is a complex of dialkyl magnesium and a trialkyl aluminum wherein the atomic ratio of Mg to Al in the organomagnesium component is within the range from about 0.3:1 to about 1000:1.

6. The process of claim 3 wherein the tetravalent titanium compound is tetraisopropoxy titanium.

7. The process of claim 1, 2, 3, 4, 5 or 6 wherein the catalyst components are added in the order (C), (D), (B), aluminum compound, if required, and (A).

8. The process of claim 1, 2, 3, 4, 5 or 6 wherein the catalyst components are added in the order (C), (D), (A), aluminum compound, if required, and (B) and provided that the halide source, (D), is other than a tin compound.

9. The process of claim 1, 2, 3, 4, 5 or 6 wherein the catalyst components are added in the order (C), (D), aluminum compound, if required, (A), and (B).

10. The process of claim 7 wherein the anhydrous divalent zinc compound is diethyl zinc.

11. The process of claim 8 wherein the anhydrous divalent zinc compound is diethyl zinc.

12. The process of claim 9 wherein the anhydrous divalent zinc compound is diethyl zinc.

13. The process of claim 9 wherein component (B) and/or any required aluminum compound is fed as a separate stream to the polymerization reactor containing the prereacted product of the other components of the catalyst.

14. The process of claim 9 wherein component (B) and/or any required aluminum compound is fed as a separate stream to a stream containing the prereacted product of the other components of the catalyst just prior to entry into the polymerization reactor.

15. The process of claim 7 wherein said α-olefin is ethylene or a mixture of ethylene and one or more higher α-olefins and/or other ethylenically polymerizable compound and wherein said process is conducted under solution polymerization conditions.

16. The process of claim 8 wherein said α-olefin is ethylene or a mixture of ethylene and one or more higher α-olefins and/or other ethylenically polymerizable compound and wherein said process is conducted under solution polymerization conditions.

17. The process of claim 9 wherein said α-olefin is ethylene or a mixture of ethylene and one or more higher α-olefins and/or other ethylenically polymerizable compound and wherein said process is conducted under solution polymerization conditions.

18. The process of claim 15 wherein the anhydrous divalent zinc compound is diethyl zinc.

19. The process of claim 16 wherein the anhydrous divalent zinc compound is diethyl zinc.

20. The process of claim 17 wherein the anhydrous divalent zinc compound is diethyl zinc.

21. The process of claim 13 wherein component (B) is diethyl zinc and said α-olefin is ethylene or a mixture of ethylene and one or more higher, polymerizable, α-olefins and/or other ethylenically polymerizable compound.

22. The process of claim 14 wherein component (B) is diethyl zinc and said α-olefin is ethylene or a mixture of ethylene and one or more higher, polymerizable, α-olefins and/or other ethylenically polymerizable compound.

23. The process of claim 21 wherein said α-olefin is a mixture of ethylene and at least one of butene-1, hexane-1 or octene-1.

24. The process of claim 22 wherein said α-olefin is a mixture of ethylene and at least one of butene-1, hexene-1 or octene-1.

* * * * *

UNITED STATES PATENT AND TRADEMARK OFFICE
CERTIFICATE OF CORRECTION

PATENT NO. : 4,308,369

DATED : December 29, 1981

INVENTOR(S) : Randall S. Shipley, Donald F. Birkelbach, and Kirby Lowery, Jr.

It is certified that error appears in the above—identified patent and that said Letters Patent is hereby corrected as shown below:

Col. 4, line 56; change "silances" to --silanes--.

Col. 9, line 12; change "terta-isopropyl" to --tetra-isopropyl--.

Col. 12, Table IV, 4th heading; change "$\overline{N}^4$ g Polymer/g Ti" to --$\overline{M}^4$ g Polymer/g Ti--.

Col. 20, line 1, Claim 23; change "hexane-" to --hexene---.

Signed and Sealed this

Fifteenth Day of June 1982

[SEAL]

Attest:

Attesting Officer

GERALD J. MOSSINGHOFF

Commissioner of Patents and Trademarks